Aug. 11, 1931.   W. F. BROWN   1,818,458
LAMINATED GLASS AND PROCESS OF PRODUCING THE SAME
Filed Dec. 9, 1927
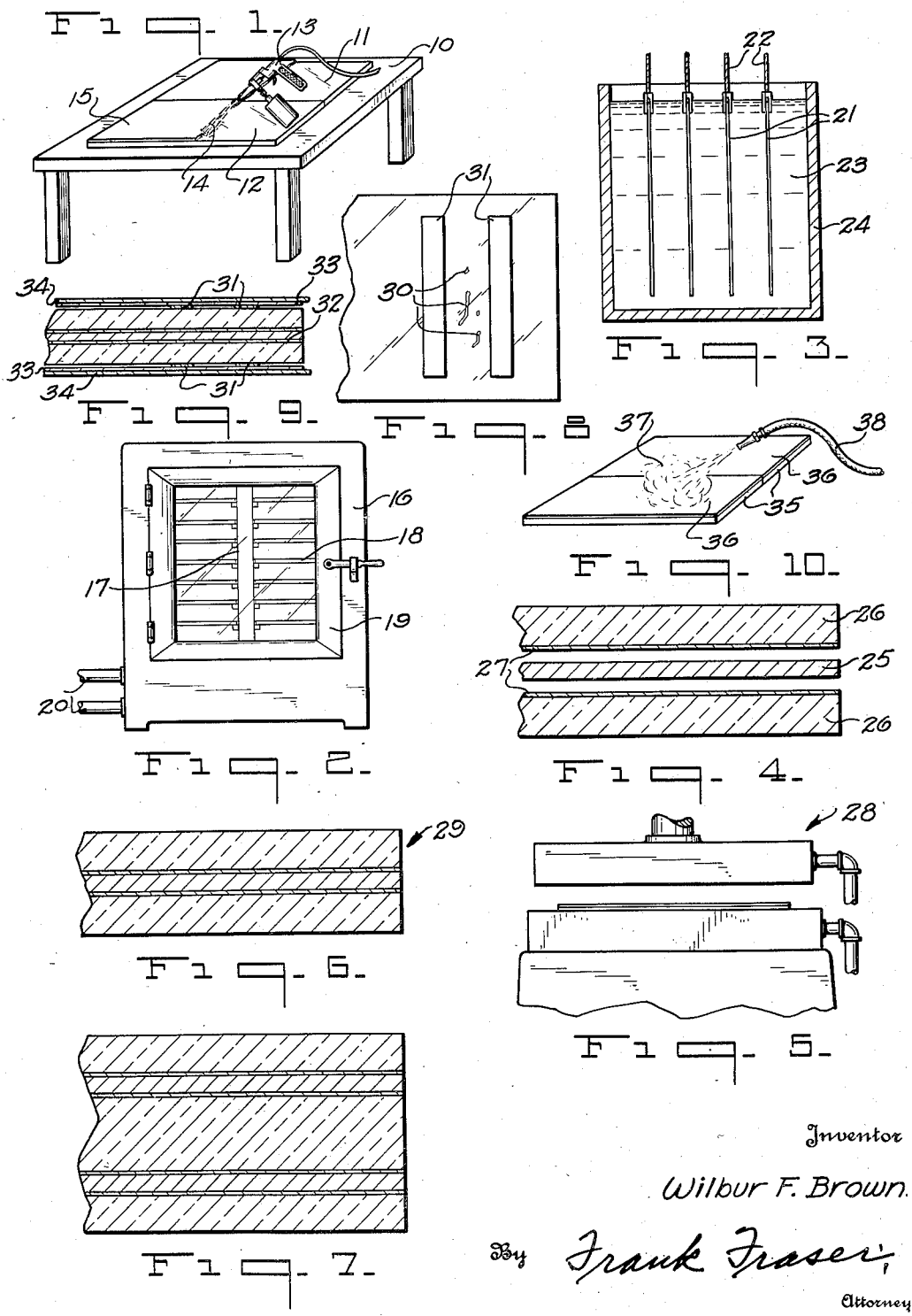
Inventor
Wilbur F. Brown.
By Frank Fraser,
Attorney Patented Aug. 11, 1931

1,818,458

UNITED STATES PATENT OFFICE

WILBUR F. BROWN, OF TOLEDO, OHIO, ASSIGNOR TO LIBBEY-OWENS-FORD GLASS COMPANY, OF TOLEDO, OHIO, A CORPORATION OF OHIO

LAMINATED GLASS AND PROCESS OF PRODUCING THE SAME

Application filed December 9, 1927. Serial No. 238,784.

The present invention relates to laminated glass and the process of producing the same.

An object of the invention is to provide such a process wherein a skin or film of gelatin is formed on one side each of two sheets of glass and allowed to dry to the desired extent, then interposing a sheet of plastic material, which has been humidified, between the gelatin coated surfaces of said sheets of glass, and then uniting the sandwich thus formed, preferably by the combined action of heat and pressure.

Another object of the invention is to provide such a process wherein one side each of two sheets of glass is chemically cleaned, after which a gelatin solution is applied to the cleaned surfaces and allowed to dry to the desired extent, then a sheet of cellulose material is humidified such as by immersion in water, after which it is removed from the bath of water and the outer surfaces thereof wiped, the sheet of cellulose material then being interposed between the gelatin coated surface of the glass sheets and the three united, preferably by the combined action of heat and pressure.

Another important object of the invention is to provide a process wherein the laminations are united by the action of heat and pressure and examined, and if the laminations have not been joined perfectly throughout their entire area, suitable shim or template means are properly arranged with respect to those portions of the laminations not properly united and the sandwich is then again subjected to heat and pressure to properly unite the laminations.

Other objects and advantages of the invention will become more apparent during the course of the following description when taken in connection with the accompanying drawings.

In the drawings wherein like numerals are employed to designate like parts throughout the same, Fig. 1 represents diagrammatically the formation of the gelatin skins on the glass sheets, Fig. 2 represents a drying cabinet in which the gelatin coated sheets may be placed, Fig. 3 represents diagrammatically one method of humidifying the cellulose composition material sheets, Fig. 4 is a sectional view illustrating the laminations before they have been united, Fig. 5 is a diagrammatic representation of a press, Fig. 6 is a fragmentary sectional view illustrating diagrammatically the finished sheet formed from the laminations illustrated in Fig. 4, Fig. 7 is a similar view of another form of laminated sheet, Fig. 8 is a fragmentary plan view illustrating the use of shims or templates to assist in obtaining a bond between these portions of the laminations not united during the previous pressing operations, Fig. 9 is a fragmentary sectional view illustrating the laminations as they are arranged when placed in the press shown in Fig. 5, and Fig. 10 is a perspective view illustrating the use of a steam bath.

In following out the present invention, the sheets of glass to be used are cleaned chemically which will be readily understood in the art. The same clean surface is desired here that is necessary to chemically clean the glass to make it possible for the silvering of the glass to be properly accomplished. It will be understood that the slightest trace of grease, dirt, or other foreign matter will have an injurious effect on the finished product. The surfaces of the glass sheets may be ground and polished or not, as desired.

In most cases it will be necessary to chemically clean only one surface of each sheet of glass, that surface being the one upon which the gelatin skin or film is formed.

In Fig. 1 is illustrated a table 10 upon which are arranged two sheets of glass 11 and 12, the two sheets being placed with edges in contact as shown. A spray gun or other means 13 may be used to spray a gelatin solution 14 upon the sheets of glass, thus forming a deposit 15 thereon. The upper exposed surfaces of the glass sheets 11 and 12, and upon which the gelatin deposit 15 is formed, are the surfaces of these two sheets which have been chemically cleaned.

The gelatine solution used consists preferably of 5%, by weight, of a high grade of gelatin dissolved in water. To produce the gelatin solution the correct quantity of gelatin is soaked in distilled water at room temperature for approximately three or three and one-half hours. After it has been soaked, it is then placed in a double boiler and the water in the outer vessel of the double boiler is kept boiling during the heating process which is continued for approximately an hour with the gelatin solution at its maximum temperature. The solution is then allowed to cool somewhat and a suitable disinfectant in liquid form is introduced. It is desirable to introduce a disinfectant in the gelatin solution to prevent putrefaction, and bichloride of mercury, cresol, formaldehyde, etc., may be used for the disinfecting purposes. I have found that one quarter of 1% U. S. P. 40% formaldehyde is very satisfactory. The solution is then filtered and is ready for use. Although I have set forth times, temperatures, and per cents in connection with the gelatin mixture, it is to be understood that I do not limit myself to the specific examples set forth as conditions may require changes one way or another. However, I have found that those above set forth give very satisfactory results.

After the deposit 15 has been formed on the sheets 11 and 12 illustrated in Fig. 1, the gelatin coated sheets may be placed in a cabinet 16. The cabinet 16 may be provided with a plurality of racks 17 upon which sheets 18 may be supported, preferably in contact with the racks at the edges of the sheet only. Of course, the coated surface of the sheet is faced upwardly so that no part of this surface will contact with the rack. A substantially air tight door 19 may be provided, with a glass front, to permit inspection of the gelatin coated sheets. The coating is allowed to dry preferably in air at about 100 degrees F., and this drying action is preferably allowed to extend over a period of from two to three hours, although of course this time may vary one way or another. Conduits 20 may be associated with the cabinet to properly control the temperature of the cabinet 16. It is also contemplated to use instead of the cabinets 16, a suitable tunnel which will permit a continuous operation, the temperature of the tunnel being suitably controlled as desired.

In one form of the invention the gelatin skins are subjected to a substantially dry atmosphere, while on the other hand it may be desirable to dry the gelatin skin in a saturated or well humified atmosphere. The humidity within the cabinet 16, or continuout tunnel if such is used, may be accurately controlled. By drying or treating the gelatin skins in a cabinet, tunnel, or the like, it is possible to obtain and maintain a constant and predetermined condition which will not be affected by atmospheric conditions or changes.

In Fig. 3 is represented diagrammatically a means for humifying the non-brittle, preferably cellulose composition material sheets 21. The sheets 21 may be supported by the clip means or the like 22 in a manner that said sheets may be completely immersed in a bath of water 23 contained in a suitable receptacle 24. I have found that the sheets can be satisfactorily humidified by immersing in a bath of water at room temperatures, the immersion lasting for upwards of an hour. Obviously, the temperature of the water can be maintained constant by arranging the receptacle in a suitably temperature controlled compartment or the like. Of course, the non-brittle sheets 21 may be humidified by arranging them in a suitable cabinet or tunnel where the humidity of the atmosphere can be accurately and properly controlled.

After the gelatin skins and the non-brittle sheet have been properly treated, the sheet is taken from the bath of water and wiped. The humidified non-brittle sheet 25 is then interposed between the glass sheets 26 which are provided with the gelatin skins 27. The laminations thus arranged are illustrated in Fig. 4. The laminations may then be placed in the press 28, designated in its entirety, where by the combined action of heat and pressure an intimate bond will be obtained between the laminations. Due to the immersion of the non-brittle sheet in the bath of water, there will be sufficient moisture present to act on the gelatin skins to obtain an excellent bond between the laminations. The term moisture is not used to indicate the presence of condensed water which is visible to the eye, but means that sufficient water is present at the surfaces of the non-brittle sheet to be bonded to moisten the gelatin skins.

Fig. 6 illustrates diagrammatically a finished sheet 29 formed from the laminations comprising the sandwich shown in Fig. 4.

I have found it desirable to press the sandwich first with one pressure and subsequently varying the pressure one way or the other until the desired bond is obtained.

It will thus be seen that the sandwich is subjected to a two cycle operation. After the second stage of the pressing has been completed, the sandwich is removed from the press and examined. In some instances "spots", designated by the numeral 30 in Fig. 8, may be present, indicating portions where the laminations are not completely united. I have found that by the use of paper shims or templates 31 that the laminated sheet can be re-pressed and the "spots" 30 removed. In some instances it is sufficient to arrange a shim on one side only of the "spots", while in other cases the shims may be arranged as shown in Figs. 8 and 9. The use of the shims is dependent upon the size, number and location of the "spots".

In Fig. 9 is a sectional view showing the sheet 32, shims 31, arranged on either side of the sheet and straddling the "spots" 30 illustrated in Fig. 8. On either side of the sheets are preferably sheets of blotting paper 33 and flexible metal plates 34. The use of the blotting sheets and metal plates has been found desirable, and in ordinary practice the sandwich is assembled and the various sheets and plates arranged on both sides of the sandwich, and the whole then placed in the press 28. As above stated, by returning the sheet to the press after the necessary shims have been properly arranged, the "spots" 30 can be eliminated. The term "spot" has been used to indicate portions of the laminations which have not been properly joined together. The re-pressing portion of my improved process overcomes the necessity of discarding the laminated sheet because of the appearance of "spots". Ordinarily, when "spots" are present in a laminated sheet, which "spots" indicate portions not properly united, it has been customary to either discard the entire sheet or endeavor to cut the laminated sheet to a different size. As far as I know, the cutting of a finished sheet of laminated glass has never been done in a successful way commercially. On the other hand, a sheet of laminated glass with the "spots" present is not desirable because such a sheet does not offer the protective qualities of a properly made sheet.

In Fig. 10 the two sheets of glass 35 each have a skin or film of gelatin 36 thereon. The skins of gelatin have been suitably dried such as by means of the cabinet 16 and are ready to be placed in a sandwich with a non-brittle sheet. Just before the sandwich is made the gelatin skins may be subjected to the action of a cloud of steam 37 which may be applied by means of a conduit 38. The cloud of steam will form sufficient moisture on the gelatin surface to render it susceptible to adhesion to the non-brittle sheet when the laminations are placed in the press as above pointed out.

In some instances it may be desirable to use a "seal" or luting to protect the bond between the laminations.

It is to be understood that the form of the invention herewith shown and described is to be taken as the preferred embodiment of the same, and that various changes in the shape, size and arrangement of parts may be resorted to without departing from the spirit of the invention or the scope of the subjoined claims.

I claim:

1. The process of producing laminated glass consisting in humidifying a sheet of non-brittle material, then interposing the humidified sheet between two glass sheets, and uniting the same.

2. The process of producing laminated glass consisting in humidifying a sheet of non-brittle material, then interposing the humidified sheet between two glass sheets, and uniting the same preferably under the action of heat and pressure.

3. The process of producing laminated glass consisting in forming a gelatin skin on one side each of two sheets of glass, humidifying a sheet of non-brittle material, then interposing the same between the gelatin coated surfaces of the sheets of glass, and then uniting the same.

4. The process of producing laminated glass consisting in forming a gelatin skin on one side each of two sheets of glass, then humidifying a non-brittle sheet by immersion in water, then interposing the humidified sheet between the gelatin coated surfaces of the two sheets of glass, and uniting the same.

5. The process of producing laminated glass consisting in forming a gelatin skin on one side each of two sheets of glass, then humidifying a non-brittle sheet by immersion in water, then interposing the humidified sheet between the gelatin coated surfaces of the two sheets of glass, and uniting the same by the combined action of heat and pressure.

6. The process of producing laminated glass consisting in applying a film of gelatin solution on one side each of two sheets of glass, drying each film to form a skin of gelatin on each sheet of glass, immersing a sheet of non-brittle material in a bath of water to humidify said sheet, then placing it between the gelatin skins to form a "sandwich," and then uniting the laminations comprising said "sandwich."

7. The process of producing laminated glass consisting in creating a gelatin solution by soaking approximately 5%, by weight, in distilled water, then heating the same, then adding a disinfectant, then applying a film of this solution to one side each of two sheets of glass, allowing the films to dry to form a skin on each sheet of glass, then humidifying a sheet of non-brittle material, interposing the same between the gelatin skins, and then uniting the same by the combined action of heat and pressure.

8. The process of producing laminated glass consisting of humidifying a sheet of cellulose composition material, interposing the humidified sheet between sheets of glass, the adjacent surfaces of the cellulose composition material and the glass sheets having an adhesive bonding agent therebetween, and then uniting the same by pressure.

9. The process of producing laminated glass consisting in humidifying a sheet of cellulose composition material, interposing the humidified sheet between sheets of glass, the adjacent surfaces of the cellulose composition material and the glass sheets having a water soluble adhesive therebetween, and then uniting the same by heat and pressure.

Signed at Toledo, in the county of Lucas and State of Ohio, this 6th day of December, 1927.

WILBUR F. BROWN.